Dec. 9, 1941.   C. F. BALL ET AL   2,265,753
CLUTCH SHIFTING MECHANISM
Original Filed June 26, 1939   3 Sheets—Sheet 1

Inventors
Charles F. Ball and
Louis G. Hilkemeier,
B. B. Collings
Attorney

Dec. 9, 1941.  C. F. BALL ET AL  2,265,753
CLUTCH SHIFTING MECHANISM
Original Filed June 26, 1939  3 Sheets-Sheet 2

Inventors
Charles F. Ball and
Louis G. Hilkemeier,
Attorney

Dec. 9, 1941.  C. F. BALL ET AL  2,265,753
CLUTCH SHIFTING MECHANISM
Original Filed June 26, 1939  3 Sheets-Sheet 3

Inventors
Charles F. Ball and
Louis G. Hilkemeier,
Attorney

Patented Dec. 9, 1941

2,265,753

UNITED STATES PATENT OFFICE 2,265,753

CLUTCH SHIFTING MECHANISM

Charles F. Ball, Wauwatosa, and Louis G. Hilkemeier, Milwaukee, Wis., assignors to Chain Belt Company, Milwaukee, Wis., a corporation of Wisconsin Original application June 26, 1939, Serial No. 281,298. Divided and this application March 13, 1940, Serial No. 323,810

3 Claims. (Cl. 192—99)

The invention relates to clutch shifting mechanism, and for purposes of the present disclosure it has been illustrated and will be described in connection with a power boom swing mechanism for concrete mixers of the paving type, such as is disclosed and claimed in our prior co-pending application filed June 26, 1939, Serial No. 281,298, of which the present application is a division. It will however be readily appreciated that the clutch shifting mechanism is not necessarily limited in its use to such boom swinging devices.

As is more fully set forth in said prior application, the boom swing mechanism constituting the subject matter thereof comprises a reversing gear unit arranged to be driven from the mixer power plant and coupled through a worm and worm gear to the boom at the vertical pivot of the latter. The reversing gear unit includes a pair of gears constantly rotating in opposite directions, each of which has a clutch associated with it by means of which it may be coupled at will to the driving worm. The said oppositely rotating gears may have sprockets or other driving members associated with them, constituting a power take-off for operating other distributing mechanism instrumentalities, such for example, as the bucket traverse mechanism described and claimed in our co-pending application filed June 26, 1939, Serial No. 281,299.

The clutch shifting mechanism of the present invention is arranged to control the above mentioned clutches which are associated with the oppositely running gears, being adapted to afford alternative engagement of the said clutches at the volition of the operator whereby the boom may be swung horizontally in one direction or the other through the worm gear drive. It is one of the objects of the invention to provide clutch shifting mechanism which will be simple in construction and effective in action, and which will automaticaly shift the clutches to neutral, i. e., insure that both of them are disengaged, through the mere release of the control handle by the operator.

With the above and other objects in view which will appear as the description proceeds, the invention consists in the novel details of construction and novel combinations and arrangements of parts more fully hereinafter described and particularly pointed out in the appended claims.

Referring to the accompanying drawings forming a part of this specification in which like reference characters designate like parts in all the views.

Figure 1:
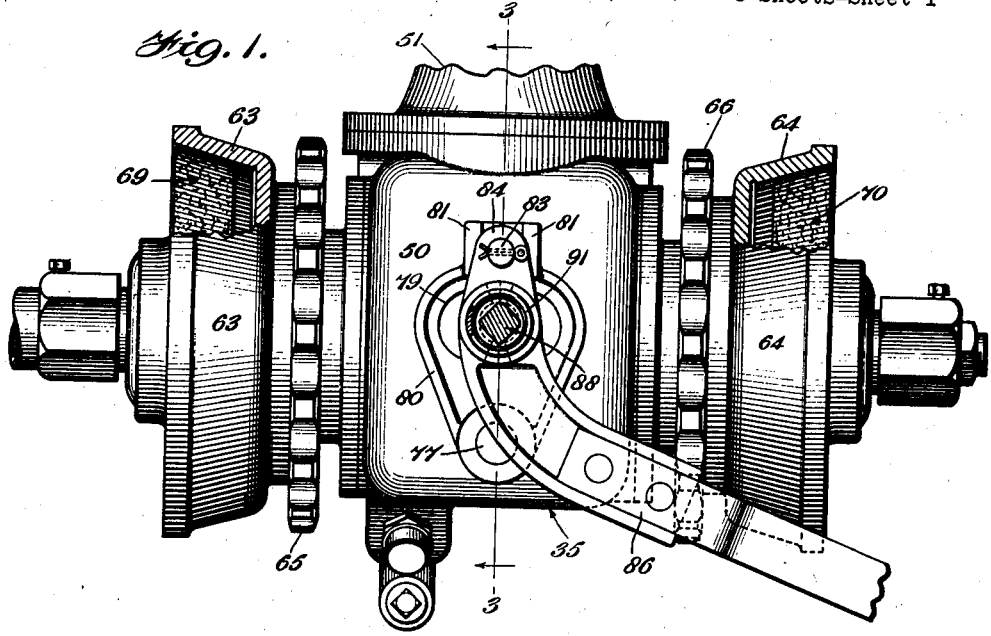
Figure 1 is a top sectional plan view of a reversing gear unit for a power boom swing mechanism, of the type disclosed in our said parent application Serial No. 281,298, with one form of clutch shifting mechanism constructed in accordance with the present invention applied thereto, the parts being shown in the neutral or disengaged position of the clutches.

Referring more particularly to the said drawings, the reversing gear unit 35 comprises a housing 50 having a lateral extension 51 in which the drive shaft 34 is journaled by bearings 52 and 53, which shaft carries the sprocket 33 at its outer end, and a bevel gear 54 at its inner end. A pair of axially alined bevel gears 55 and 56 mesh with the said gear 54 at opposite sides thereof, and have hubs 57 and 58 respectively, journaled in bearings 59 and 60 mounted in the end plates 61 and 62 of the housing 50. The respective gear hubs 57 and 58 have keyed or otherwise rigidly secured to them the driving members 63 and 64 of a pair of friction clutches, here shown as being of the cone type, and these clutch members have rigidly secured to them the sprockets 65 and 66 which serve as the driving elements of a power take-off for operating the bucket traverse and boom hoist mechanism of the paver, as fully disclosed in our said co-pending application Ser. No. 281,299.

Figure 4:
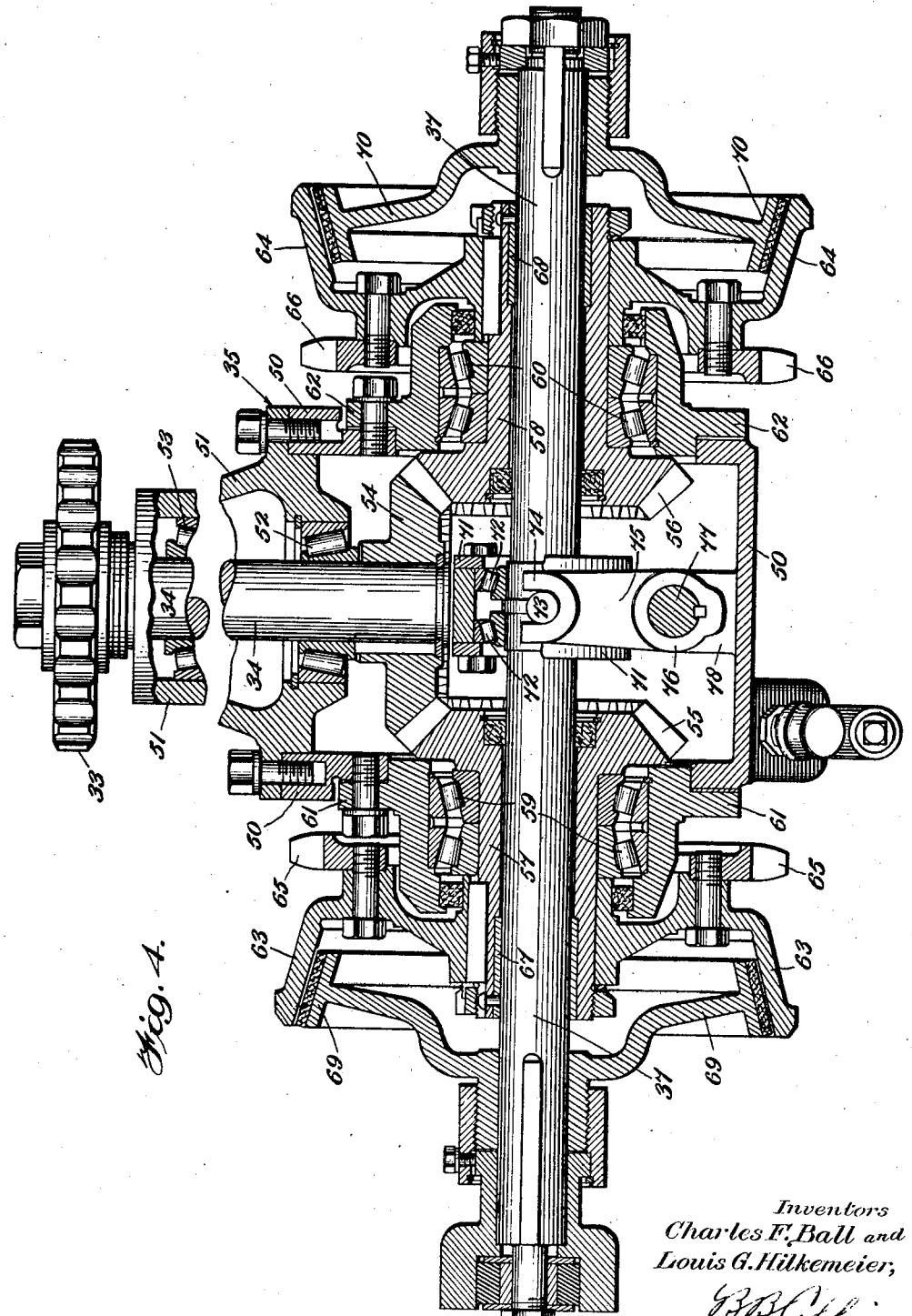
Fig. 4 is a horizontal sectional view, taken approximately on the plane indicated by the line 4—4 of Fig. 3, looking down.

The driven shaft 37 of the unit 35 extends axially through the alined hubs 57 and 58 of the gears 55 and 56, and is slidably and rotatably journaled in bearings 67 and 68 carried by the said hubs. Beyond the said hubs shaft 37 has secured to it the driven clutch members 69 and 70 which, through axial movements of the said shaft in one direction or the other from the neutral position illustrated in Fig. 4, are adapted to be brought into alternative engagement with the driving clutch members 63 and 64 respectively, as will be readily understood.

Figure 2:
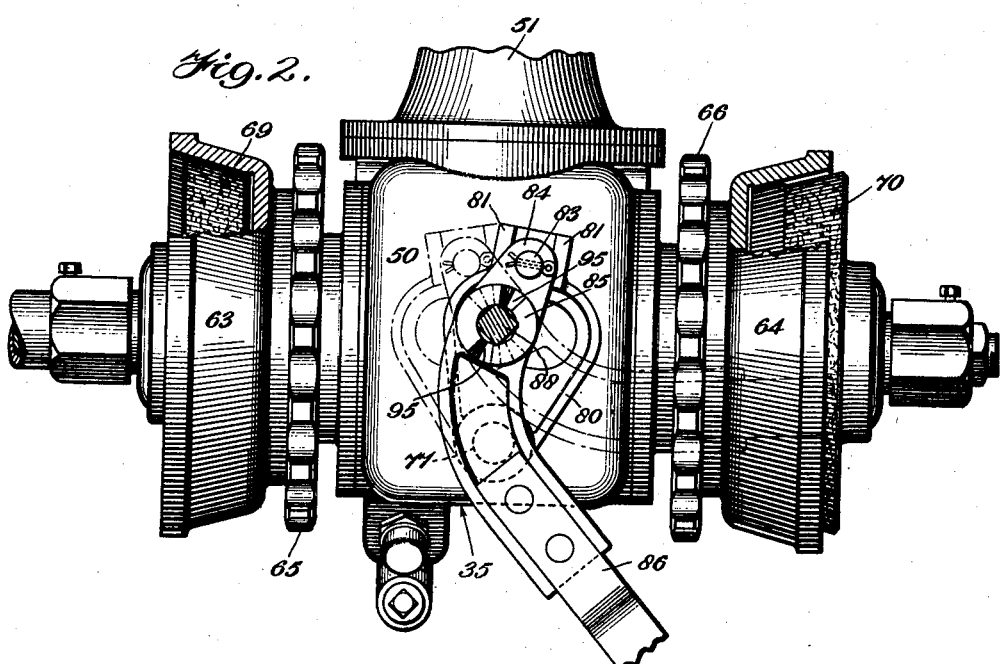
Fig. 2 is a view similar to Fig. 1, but showing in full and broken lines the alternative positions of the parts when one or the other of the clutches is engaged.
Figure 3:
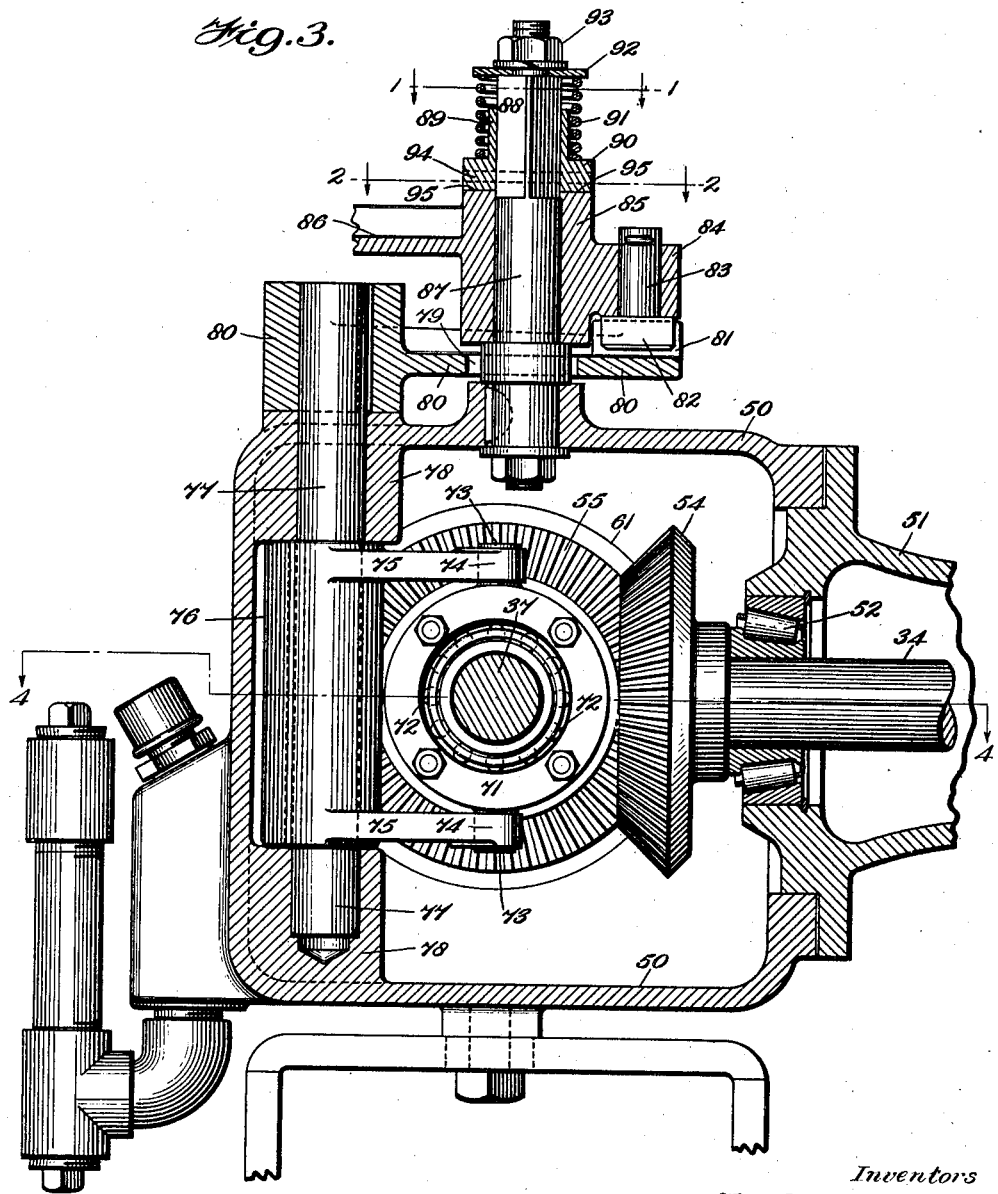
Fig. 3 is an enlarged transverse sectional view, taken approximately on the plane indicated by the line 3—3 of Fig. 1, looking in the direction of the arrows.

For shifting the shaft 37 axially to engage and disengage the clutches, the said shaft is provided intermediate the gears 55 and 56 with a shifting collar 71 mounted on bearings 72 and having pins 73 engaged by the bifurcated ends 74 of the arms 75 of a shifting fork 76, which is keyed or otherwise rigidly secured to a vertical shaft 77 journaled in bearings 78 of the housing 50, see Fig. 3. The upper end of the shaft 77 extends outside the housing 50 and has rigidly secured to it an actuating arm 80, the outer end of which is provided with a pair of spaced lugs 81 arranged to receive between them the head 82 of a pin 83 carried by an extension 84 of the hub 85 of an operating lever 86. The said hub 85 is journaled upon a stub shaft 87, fixedly secured in and extending upwardly from the housing 50 through an aperture 79 in the arm 80. The upper portion of the stub shaft 87 is squared, as indicated at 88, see Fig. 3, and slidably but non-rotatably carries a sleeve 89 having a flange 90 abutting the upper face of the hub 85. A compression spring 91 is interposed between the upper face of the flange 90 and a washer 92 secured to the end of the stub shaft above its squared portion by a nut 93, which spring constantly yieldingly maintains the flange 90 in engagement with the hub 85. The lower face of the flange 90 is provided with one or more V-shaped lugs 94 and the upper face of the hub 85 is provided with one or more complementary V-shaped depressions 95 for coacting with the said lugs 94. When the parts are in the neutral positions illustrated in Figs. 1, 3 and 4, the lugs 94 are alined with and fit in the depressions 95, thus maintaining the parts in said neutral positions against unintentional displacement. However, when the parts are moved to either clutch-engaging position, through manual movement of the operating lever 86 from the neutral position illustrated in Fig. 1 to either of the positions shown in Fig. 2, the arcuate movement of the lever hub 85 will move its depressions 95 out of line with the lugs 94, which are held against rotation by the squared portion 88 of the stub shaft, and due to the camming action of the complementary surfaces of the lugs and depressions, the sleeve 89 will be forced upwardly against the pressure of the spring 91. The parts are so constructed and arranged that the lugs never completely leave the depressions, so that upon release of the lever 86 by the operator, the spring 91, through the camming action of the lug surfaces upon the complementary surfaces of the hub depressions, will automatically return the hub 85, lever 86 and the clutch elements 69 and 70 to the neutral position, thereby insuring against swinging movements of the boom except when under the actual manual control of the operator.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. Shifting mechanism for a power transmitting clutch contained within a housing, said clutch having driving and driven members one of which is movable into and out of power transmitting engagement with the other, said shifting mechanism comprising a shifting fork pivotally mounted within the housing and connected to the movable clutch member; an apertured actuating arm disposed exteriorly of the housing and rigidly connected to said fork, said arm being provided with a pair of spaced lugs; a stub shaft extending exteriorly from the housing and projecting through the aperture in said arm; an operating lever mounted on said stub shaft; and a pin carried by said lever, extending between said lugs and affording a sliding operating connection between said lever and arm.

2. Clutch shifting and neutralizing mechanism for a pair of alternatively engageable clutches mounted on an axially movable shaft, comprising a shifting collar carried by said shaft; a pivotally mounted shifting fork engaging said collar; an actuating arm connected to said fork to oscillate the latter; a fixed stub shaft; an operating lever journaled on said stub shaft, said lever being provided with a cam surface; an operating connection between said lever and arm; and a spring pressed sleeve non-rotatably mounted on said stub shaft, having a cam surface disposed to coact with said lever-carried cam surface to automatically return said lever, arm, fork and clutches to a neutral position upon release of said lever.

3. Clutch shifting and neutralizing mechanism for a power transmitting clutch provided with driving and driven members one of which is movable into and out of engagement with the other, said mechanism comprising a shifting fork connected to said movable clutch member; an actuating arm connected to said fork; a fixed stub shaft; an operating lever mounted on said stub shaft, having a hub one face of which is provided with a V-shaped cam surface; an operating connection between said lever and arm; a sleeve non-rotatably mounted on said stub shaft having a complemental V-shaped cam surface in continuous engagement with said first named cam surface, and a spring concentric with said stub shaft and engaging said sleeve to maintain said engagement of the cam surfaces, whereby to automatically return said lever, arm, fork and clutch member to neutral position upon release of said lever.

CHARLES F. BALL.
LOUIS G. HILKEMEIER.